United States Patent [19]

Wakahara

[11] Patent Number: 5,782,718
[45] Date of Patent: Jul. 21, 1998

[54] WORKING FLUID PRESSURE CONTROL DEVICE FOR HYDRAULIC CONTROL SYSTEM OF CONTINUOUSLY VARIABLE TRANSMISSION

[75] Inventor: Tatsuo Wakahara, Kawasaki, Japan

[73] Assignee: Nissan Motor Co., Ltd., Yokohama, Japan

[21] Appl. No.: 495,274

[22] Filed: Jun. 27, 1995

[30] Foreign Application Priority Data

Jun. 27, 1994 [JP] Japan .................................. 6-144593
Jun. 27, 1994 [JP] Japan .................................. 6-144594
Jun. 27, 1994 [JP] Japan .................................. 6-144595

[51] Int. Cl.$^6$ .............................. F16H 61/04; F16H 9/00
[52] U.S. Cl. ........................... 477/45; 477/48; 477/62; 477/169
[58] Field of Search ..................... 477/45, 46, 48, 477/58, 61, 62, 168, 169

[56] References Cited

U.S. PATENT DOCUMENTS

| | | | |
|---|---|---|---|
| 4,759,236 | 7/1988 | Tezuka et al. | 477/46 X |
| 4,846,765 | 7/1989 | Sakai | 477/61 X |
| 5,211,083 | 5/1993 | Hattori et al. | 477/45 X |

FOREIGN PATENT DOCUMENTS

| | | | |
|---|---|---|---|
| 61-105353 | 5/1986 | Japan . | |
| 5-332445 | 12/1993 | Japan | 477/46 |
| 6-26563 | 2/1994 | Japan . | |

Primary Examiner—Khoi Q. Ta
Attorney, Agent, or Firm—Foley & Lardner

[57] ABSTRACT

A working fluid pressure control device for a hydraulic control system of a V-belt type continuously variable transmission comprises a line pressure regulator valve, a pressure reducer valve, a pressure modifier valve, in which the line pressure regulator valve developing a regulated line pressure for cylinder chambers of driving and driven pulleys of the transmission from a source pressure applied from a hydraulic pump driven by an engine associating with the transmission, the pressure reducer valve developing a reduced output pressure for a forward clutch and a reverse brake of the transmission from a source pressure supplied from the line pressure regulator valve, and the pressure modifier valve developing a pilot pressure for the line pressure regulator valve. There is provided a line pressure characteristics changing means which changes a characteristics of the line pressure relating to at least a transmission ratio, between a higher characteristics and a lower characteristics corresponding to whether a lock-up mechanism of a torque converter of the transmission is executing locking-up or not.

11 Claims, 10 Drawing Sheets

FIG_1

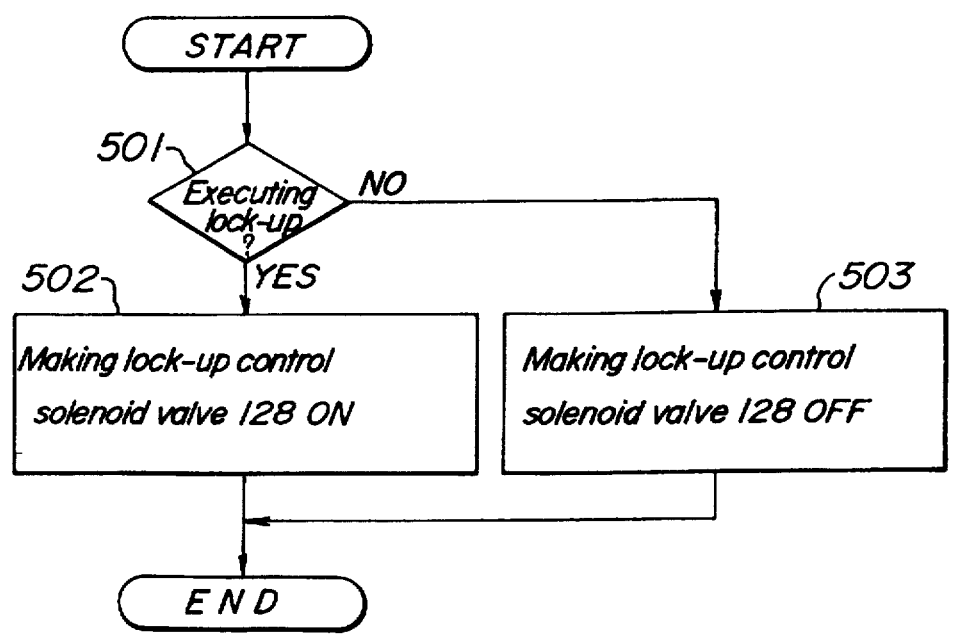
FIG_4

(Non-locking-up condition)

(Lock-up condition)

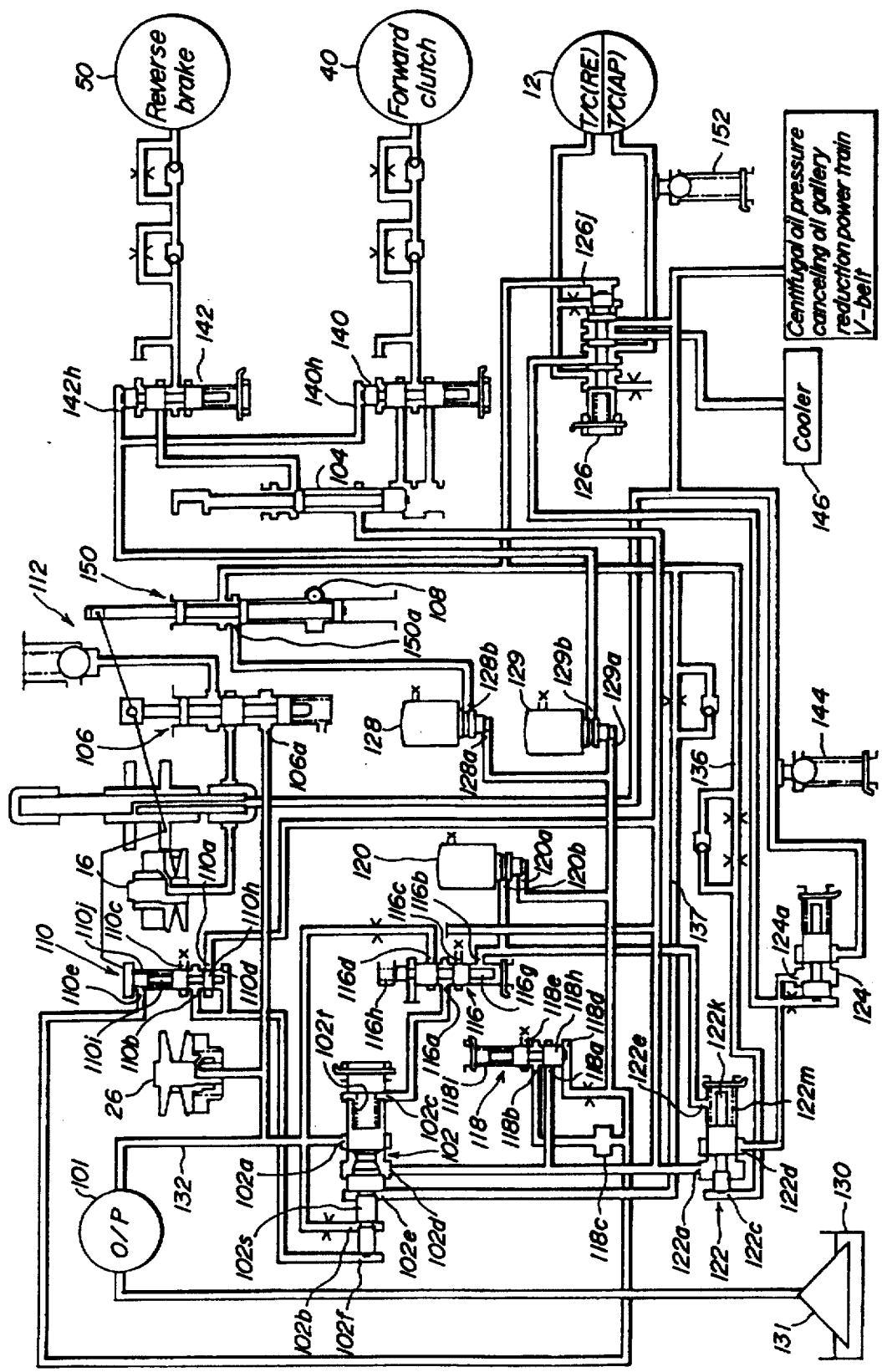

WORKING FLUID PRESSURE CONTROL DEVICE FOR HYDRAULIC CONTROL SYSTEM OF CONTINUOUSLY VARIABLE TRANSMISSION

BACKGROUND OF THE INVENTION

1. Field of the Invention

The present invention generally relates to a hydraulic control system of a continuously variable transmission of V-belt type, for e.g. an automotive vehicle, which transmission including a torque converter with a lock-up mechanism and associated with an engine. More specifically, the present invention relates to a working fluid pressure control device for the hydraulic control system of the continuously variable transmission.

2. Description of the Related Art

A V-belt type continuously variable transmission including a torque converter with a lock-up mechanism and associated with an engine is known from Japanese Patent Application laid-open No. 61-105353. The known continuously variable transmission controls a pulley ratio which corresponds to a transmission ratio between an input rotating speed of a driving shaft and an output rotating speed of a driven shaft, by varying radiuses of contacting points between a V-belt and two pulleys i.e. a driving pulley and a driven pulley. In the known continuously variable transmission, the variations of radiuses of contacting points between the V-belt and the two pulleys are brought by varying width of grooves of the pulleys. Each of the pulleys has an axially movable conical disk and a stationary conical disk, which define the groove. An axial position of the movable conical disk of each of the pulleys is controlled by a hydraulic control system of the transmission. The hydraulic control system has a transmission ratio control valve actuated by a stepping motor which is controlled with a rotating angle of an output shaft thereof. The transmission ratio is feedback controlled by the hydraulic control system as explained below.

Each of the pulleys are provided with a cylinder chamber, while the axially movable conical disk of each of the pulleys is formed with a piston slidably fitted in the cylinder chamber into which a hydraulic pressure is supplied, so that, owing to the hydraulic pressure, the V-belt running between the pulleys is gripped between the conical disks at each of the pulleys and the width of the groove is maintained even when a driving force and hence a torque to be transmitted is varied. Into the cylinder chamber of the driven pulley, a line pressure is supplied as the hydraulic pressure, the line pressure is developed by a line pressure regulator valve supplied with a pilot pressure corresponding to a throttle valve opening degree. Therefore, the line pressure is regulated corresponding to the throttle valve opening degree and hence a load of the engine, which load varies a driving force to be transmitted, so that a gripping force enough to prevent slipping of the V-belt is developed between the disks of the driven pulley even when the engine load is heavy.

A spool of the line pressure regulator valve is urged by a spring supported by an end of a lever, which lever end is further connected to the axially movable conical disk of the driving pulley, while another end of the lever is connected to a rod moved by the stepping motor, and an approximately center of the lever is connected to a spool of a transmission ratio control valve which supplies a hydraulic pressure obtained from the line pressure into the cylinder chamber of the driving pulley and controls the hydraulic pressure. When the rod is moved by rotation of the output shaft of the motor so as to tilt the lever, the lever moves the spool of the transmission ratio control valve causing variation of the hydraulic pressure in the cylinder chamber of the driving pulley, so that the axially movable conical disk of the driving pulley is moved by the varied hydraulic pressure in the cylinder chamber, which causes variation of the transmission ratio. The movement of the axially movable conical disk further causes movement of the spool of the line pressure regulator valve. Therefore, corresponding to a driving force to be transmitted which, in turn, corresponding to not only the throttle valve opening degree but also the transmission ratio, the line pressure for both of the pulleys is regulated, so that a gripping force enough to prevent slipping of the V-belt is developed when the transmission ratio is large, and a gripping force not excess to prevent slipping of the V-belt is developed when the transmission ratio is small.

Another V-belt type continuously variable transmission including a torque converter with a lock-up mechanism is known from Japanese Patent Application laid-open No. 6-26563, in which a hydraulic control system comprises a line pressure regulator valve of which a spool is not linked to the axially movable conical disk of the driving pulley. In the hydraulic control system of the known continuously variable transmission of the latter, for regulating the line pressure corresponding to a driving force to be transmitted, there is provided a working fluid pressure control device including the line pressure regulator valve, a pressure reducer valve and a pressure modifier valve controlled by a solenoid valve. In the known working fluid pressure control device, an output pressure of the line pressure regulator valve becomes a source pressure for the pressure reducer valve, while a reduced output pressure of the pressure reducer valve becomes a constant source pressure (e.g. 6 kgf/cm$^2$) for the pressure modifier valve, further an output pressure of the pressure modifier valve becomes a pilot pressure for the line pressure regulator valve. By such a working fluid pressure control device, for example, a line pressure characteristics as shown in FIG. 10 is obtained.

By the way, in the known continuously variable transmission of the latter, the torque converter transmits larger torque under non-locking-up condition of the lock-up mechanism than a torque under locking-up condition due to a torque enhancing action of the torque converter, so that, in the working fluid pressure control device, the line pressure is required to be relatively high to prevent slipping of the V-belt under the non-locking-up condition. Further, the known continuously variable transmission of the latter includes a forward clutch and a reverse brake, which are provided in a forward-drive/reverse-drive switching mechanism interposed between the torque converter and the driving pulley, and which are urged by a constant clutch pressure developed from the line pressure by a clutch valve, so that, in the working fluid pressure control device, the clutch pressure is required to be relatively high to prevent slipping of the forward clutch and the reverse brake under the non-locking-up condition of the lock-up mechanism subjecting the larger torque.

On the other hand, under locking-up condition of the torque converter, such a high line pressure and a high clutch pressure are not always required due to input and output elements of the torque converter being directly connected by execution of locking-up of the lock-up mechanism. Therefore, under the locking-up condition, it is preferable to develop relatively low line pressure and relatively low clutch pressure, because a hydraulic pump for the control system consumes less energy for generating a source pressure supplied for the line pressure regulator valve developing such a low line pressure and such a low clutch pressure, which results in advanced fuel consumption ratio of the engine associated with the transmission and driving the hydraulic pump.

However, in the known working fluid pressure control device, the line pressure regulator valve regulates the line pressure according to only one line pressure characteristics relating to the transmission ratio as shown in FIG. 10, because the pressure modifier valve can only supply the pilot pressure which varies in a bounds (e.g. between 0 kgf/cm$^2$ and 6 kgf/cm$^2$) below the constant source pressure (e.g. 6 kgf/cm$^2$) under control of the solenoid valve. Therefore, the line pressure regulator valve regulates the line pressure in a wide bounds (e.g. between 7 kgf/cm$^2$ and 46 kgf/cm$^2$) according to the only one line pressure characteristics with the pilot pressure in the bounds (e.g. between 0 kgf/cm$^2$ and 6 kgf/cm$^2$) to prevent slipping of the V-belt under the non-locking-up condition and to obtain an advanced fuel consumption ratio under the locking-up condition, so that a control gain G of the line pressure regulator valve becomes high as 6.5 (i.e. G=(46−7)/(6−0)=6.5). With such a high control gain G, a little variation of the output pressure of the pressure modifier valve causes large variation of the line pressure, which tends to generate hydraulic pressure vibration causing deterioration of line pressure control precision.

Further, in the known working fluid pressure control device, the lowest pressure in the line pressure characteristics is required to be very low (e.g. 7 kgf/cm$^2$ in FIG. 10) for an advanced fuel consumption ratio of the engine even under the non-locking-up condition. Therefore, the constant clutch pressure developed from the line pressure is not always enough to prevent slipping of the forward clutch and the reverse brake, especially in a higher range of the transmission ratio.

That is, in the known working fluid pressure control device, it is difficult to achieve both of an advanced fuel consumption ratio and higher clutch pressure, because the advanced fuel consumption ratio is brought from a lower line pressure while the higher clutch pressure restrains reduction of the line pressure.

SUMMARY OF THE INVENTION

It is therefore an object of the present invention to provide an improved working fluid pressure control device for a hydraulic control system of a continuously variable transmission of V-belt type including a torque converter with a lock-up mechanism and associated with an engine, which is capable of developing a higher line pressure under non-locking-up condition of the lock-up mechanism so as to prevent slipping of the V-belt, the forward clutch and the reverse brake, while capable of developing a lower line pressure under locking-up condition of the lock-up mechanism so as to achieve an advanced fuel consumption ratio of the engine associated with the transmission, with lower control gain of the line pressure regulator valve.

Briefly stated, the present invention provides a working fluid pressure control device for a hydraulic control system of a continuously variable transmission of V-belt type, the transmission including a torque converter with a lock-up mechanism and associated with an engine, a driving pulley with a cylinder chamber for varying a groove width thereof, a driven pulley with a cylinder chamber for varying a groove width thereof, a V-belt for transmitting driving force between the driving and driven pulleys, and a forward-drive/reverse-drive switching mechanism interposed between the torque converter and the driving pulley and having a forward clutch and a reverse brake, the working fluid pressure control device comprising a line pressure regulator valve, a pressure reducer valve, a pressure modifier valve, in which the line pressure regulator valve developing a regulated line pressure for the cylinder chambers of the driving and driven pulleys from a source pressure supplied from a hydraulic pump driven by the engine, the pressure reducer valve developing a reduced output pressure for the forward clutch and the reverse brake from a source pressure supplied from the line pressure regulator valve, and the pressure modifier valve developing a pilot pressure for the line pressure regulator valve.

In the working fluid pressure control device according to the present invention, there is provided a line pressure characteristics changing means which changes a characteristics of the line pressure relating to at least a transmission ratio, between a higher characteristics and a lower characteristics corresponding to whether the lock-up mechanism is executing locking-up or not.

With the working fluid pressure control device according to the present invention, when the lock-up mechanism is not executing locking-up, the line pressure characteristics changing means changes a line pressure characteristics relating to at least a transmission ratio, from the lower characteristics to the higher characteristics in which wholly higher line pressure is developed by the line pressure regulator valve, on the other hand when the lock-up mechanism is executing locking-up, the line pressure characteristics changing means changes a line pressure characteristics relating to at least a transmission ratio, from the higher characteristics to the lower characteristics in which wholly lower line pressure is developed by the line pressure regulator valve. Thus, the working fluid pressure control device for a hydraulic control system according to the present invention is capable of developing higher line pressure and higher clutch pressure under non-locking-up condition of the lock-up mechanism so as to prevent slipping of a V-belt, a forward clutch and a reverse brake, while capable of developing lower line pressure under locking-up condition of the lock-up mechanism so as to achieve an advanced fuel consumption ratio of the engine associated with the transmission.

Further, in the higher characteristics, wholly higher line pressure is developed by the line pressure regulator valve, on the other hand in the lower characteristics, wholly lower line pressure is developed by the line pressure regulator valve, so that in each line pressure characteristics the line pressure regulator valve regulates the line pressure in narrower bounds in accordance with the pilot pressure for the line pressure regulator valve. Thus, the working fluid pressure control device for a hydraulic control system according to the invention is capable of obtaining lower control gain of the line pressure regulator valve which causes advanced line pressure control precision.

In a preferred embodiment of the present invention, the reduced output pressure developed by the pressure reducer valve is supplied as a source pressure for the pressure modifier valve, and the line pressure characteristics changing means comprises a solenoid valve which controls the pressure reducer valve to change the source pressure for the pressure modifier valve between a higher pressure and a lower pressure.

While the preferred embodiment of the present invention, when the lock-up mechanism is not executing locking-up, the pressure modifier valve supplies a higher pressure (e.g.

between 0 kgf/cm² and 10 kgf/cm²) modified from the higher source pressure, as the pilot pressure for the line pressure regulator valve to obtain the higher characteristics of the line pressure (e.g. between 11 kgf/cm² and 46 kgf/cm²), on the other hand when the lock-up mechanism is executing locking-up, the pressure modifier valve supplies a lower pressure (e.g. between 0 kgf/cm² and 6 kgf/cm²) modified from the lower source pressure, as the pilot pressure for the line pressure regulator valve to obtain the lower characteristics of the line pressure (e.g. between 7 kgf/cm² and 30 kgf/cm²). Thus, the preferred embodiment of the working fluid pressure control device according to the invention is capable of obtaining lower control gain of the line pressure regulator valve (i.e. G=(46−11)/(10−0)=3.5 under the non-locking-up condition, while G=(30−7)/(6−0) =3.83 under the locking-up condition), which causes advanced line pressure control precision.

In addition to the above-mentioned merit, with the preferred embodiment of the present invention, when the lock-up mechanism is not executing locking-up, the pressure reducer valve supplies the higher pressure for not only the pressure modifier valve but also the forward clutch and the reverse brake, on the other hand when the lock-up mechanism is executing locking-up, pressure reducer valve supplies the lower pressure for not only the pressure modifier valve but also the forward clutch and the reverse brake. Thus, the preferred embodiment of the working fluid pressure control device according to the invention is capable of achieving both of an advanced fuel consumption ratio and higher clutch pressure.

In a further preferred embodiment of the present invention, the working fluid pressure control device has a common solenoid valve for the line pressure characteristics changing means and for lock-up control means for controlling the lock-up mechanism.

With the further preferred embodiment, a constitution of the working fluid pressure control device can be simplified, owing to the common solenoid valve.

In another preferred embodiment of the present invention, the regulated line pressure developed by the line pressure regulator valve is directly supplied as a source pressure for the pressure modifier valve, and the line pressure characteristics changing means comprises a solenoid valve which controls the pressure modifier valve to change the pilot pressure for the line pressure regulator valve between a higher pressure and a lower pressure.

With the preferred embodiment of the present invention, when the lock-up mechanism is not executing locking-up, the pressure modifier valve controlled by the solenoid supplies a higher pressure modified from the line pressure, as the pilot pressure for the line pressure regulator valve to obtain the higher characteristics of the line pressure, on the other hand when the lock-up mechanism is executing locking-up, the pressure modifier valve controlled by the solenoid supplies a lower pressure modified from the line pressure, as the pilot pressure for the line pressure regulator valve to obtain the lower characteristics of the line pressure. Thus, the working fluid pressure control device for a hydraulic control system according to the invention is capable of obtaining lower control gain of the line pressure regulator valve which causes advanced line pressure control precision.

Further, with the preferred embodiment, an incline of the lower characteristics of the line pressure can be varied from an incline of the higher characteristics of the line pressure, owing to the feedback of the line pressure to the line pressure regulator valve through the pressure modifier valve, which reduces the highest line pressure in the lower characteristics of the line pressure for the locking-up condition of the lock-up mechanism, causing further advanced fuel consumption ratio of the engine associated with the transmission, without causing slipping of the V-belt under the non-locking up condition.

In a further preferred embodiment of the present invention, the solenoid valve for the line pressure characteristics changing means further controls the pressure reducer valve.

With the further preferred embodiment, the solenoid valve makes the pressure reducer valve to change the reduced output pressure as the clutch pressure for the forward clutch and the reverse brake between a higher pressure and a lower pressure, simultaneously with changing of the line pressure characteristics. Therefore, a lower line pressure under the locking up condition for achieving an advanced fuel consumption ratio of the engine can be achieved especially in a higher range of the transmission ratio, while a higher clutch pressure enough to prevent slipping of the forward clutch and the reverse brake under the non-locking up condition can be obtained.

BRIEF DESCRIPTION OF THE DRAWINGS

The present invention will now be explained in more detail with reference to a preferred embodiment shown in the attached drawings, in which:

FIG. 4 is a flow chart showing a control program which is executed by the electronic control system shown in FIG. 3, for the first embodiment of a working fluid pressure control device according to the present invention;

FIG. 6 is a schematic diagram showing another example of a hydraulic control system of the continuously variable transmission shown in FIG. 1, which hydraulic control system includes the second preferred embodiment of a working fluid pressure control device according to the present invention;

Figure 1:
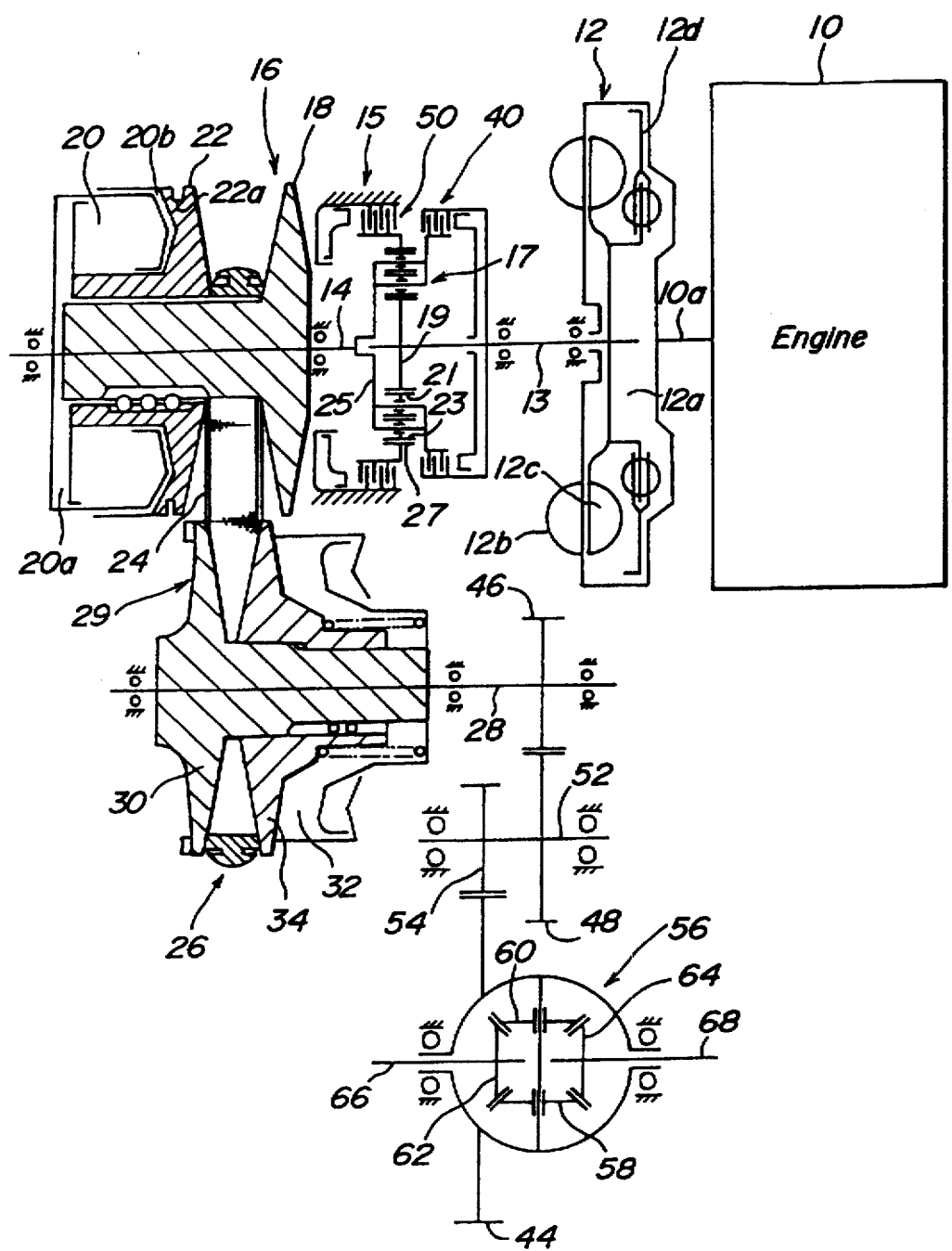
FIG. 1 is a skeleton diagram showing one example of a continuously variable transmission of V-belt type for an automotive vehicle, which transmission includes a torque converter with a lock-up mechanism and associated with an engine.
Figure 8:
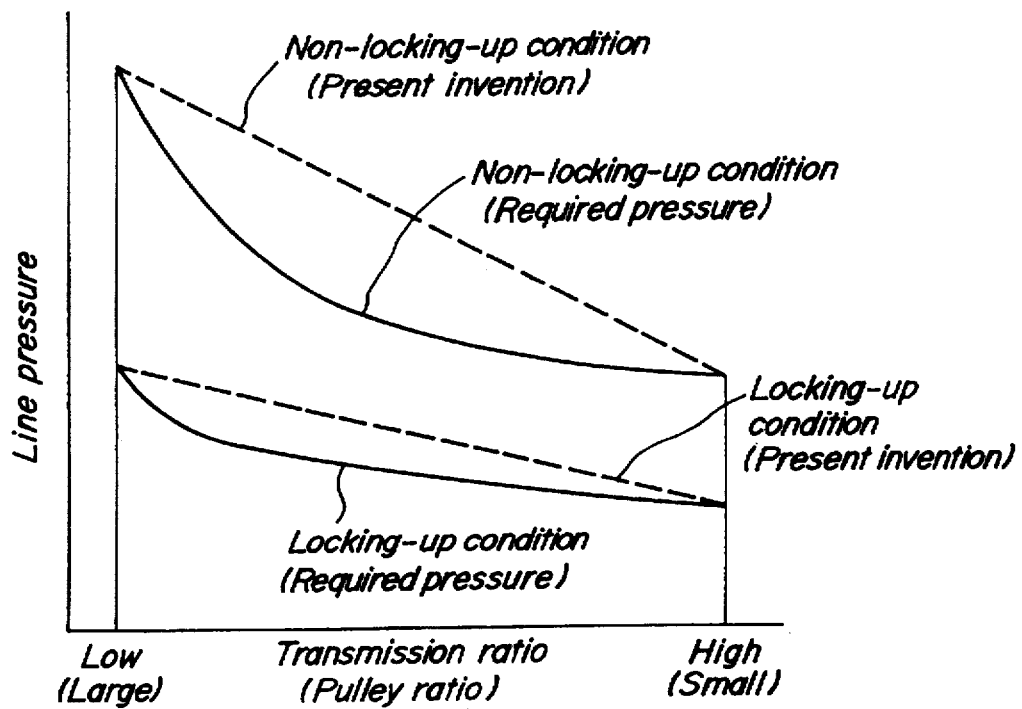
Figure 9:
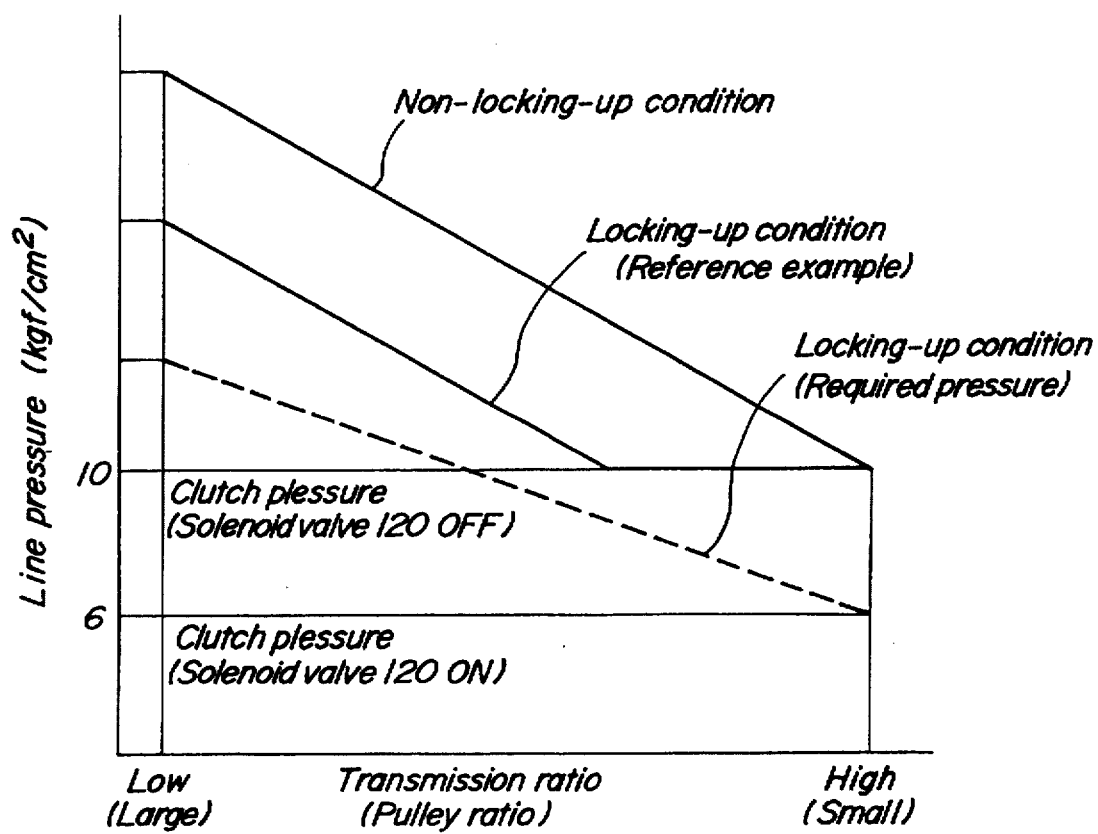
Figure 10:
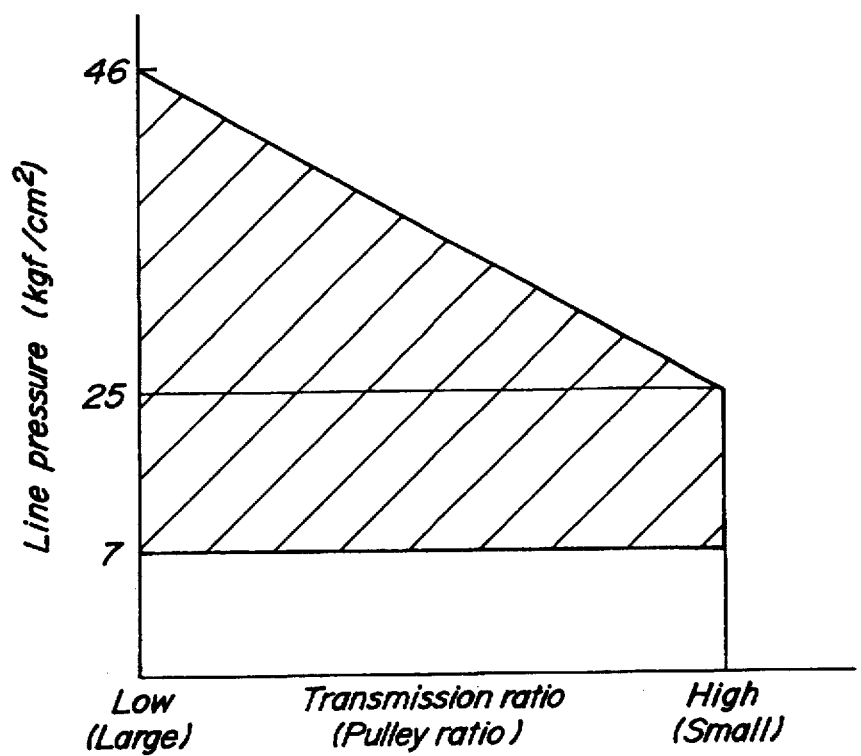

3, for the second embodiment of a working fluid pressure control device according to the present invention;

FIG. 8 is a diagram explaining operation of a reference working fluid pressure control device for a hydraulic control system for the continuously variable transmission shown in FIG. 1;

FIG. 9 is a diagram explaining operation of the second embodiment of a working fluid pressure control device according to the present invention; and FIG. 10 is a diagram explaining operation of the working fluid pressure control device in the known hydraulic control system of the latter.

DETAILED EXPLANATION OF THE PREFERRED EMBODIMENTS

Referring now to FIG. 1, there is shown one example of a continuously variable transmission of V-belt type, for an automotive vehicle, which transmission includes a torque converter with a lock-up mechanism and associated with an engine. The continuously variable transmission has the hydraulic control system shown in FIG. 2, including the first preferred embodiment of a working fluid pressure control device according to the present invention.

That is, the continuously variable transmission is associated with an engine 10 mounted on an automotive vehicle not shown, and has a torque converter 12 to which an output shaft 10a of the engine 10 is connected. The torque converter 12 has a pump impeller 12b as an input element, a turbine runner 12c as an output element, a converter chamber containing the pump impeller 12b and the turbine runner 12c and filled with working oil as working fluid, and a lock-up mechanism. The lock-up mechanism includes a lock-up clutch 12d connected to the turbine runner 12c and a releasing chamber 12e separated from the converter chamber by the lock-up clutch 12d. The lock-up mechanism executes locking-up when the working oil in the converter chamber is pressurized while working oil is drained from the releasing chamber 12a, in which locking-up condition the lock-up clutch 12d mechanically connects the turbine runner 12c to the pump impeller 12b. When pressurized working oil is supplied in the releasing chamber 12b, the lock-up clutch 12d releases the pump impeller 12b, so that the lock-up mechanism presents a non-locking-up condition. The turbine runner 12c of the torque converter 12 is connected to a rotational shaft 13 which, in turn, connected to a forward-drive/reverse-driven switching mechanism 15 having a planetary gearing mechanism 17, a forward clutch 40 and a reverse brake 50.

The planetary gearing mechanism 17 consists of a sun gear 19, mutually engaging two pinion gears 21, 23, a pinion carrier 25 rotatably supporting the pinion gears 21, 23, and an internal gear 27. In the planetary gearing mechanism 17, the pinion gear 21 is engaged with the sun gear 19, while the pinion gear 23 is engaged with the internal gear 27. The sun gear 19 is connected to the rotational shaft 13 so that the sun gear 19 rotates solidly with the rotational shaft 13. The pinion carrier 25 can be connected to the rotational shaft 13 through the forward clutch 40. The internal gear 27 can be secured to a stationary part of the continuously variable transmission through the reverse brake 50. Further, the pinion carrier 25 is connected to a driving shaft 14 which is provided with a driving pulley 16.

The driving pulley 16 has a stationary conical disk 18 which rotates solidly with the driving shaft 14, an axially movable conical disk 22 which is opposed to the stationary conical disk 18 to define a V-shaped groove, and a cylinder chamber 20. The axially movable conical disk 22 is formed with a hydraulic piston slidably fitted in the cylinder chamber 20, and is axially moved by a hydraulic pressure supplied into the cylinder chamber 20. The cylinder chamber 20 consists of two parts 20a, 20b, and has a pressure subjecting area which is two times as large as that of a cylinder chamber 32 mentioned-below. The driving pulley 16 is drivably connected to a driven pulley 26 through a V-belt 24 running between the pulleys 16, 24.

The driven pulley 25 has a stationary conical disk 30 which is provided on a driven shaft 28 and which rotates solidly with the driven shaft 28, an axially movable conical disk 34 which is opposed to the stationary conical disk 30 to define a V-shaped groove, and the cylinder chamber 32. The axially movable conical disk 34 is formed with a hydraulic piston slidably fitted in the cylinder chamber 32, and is axially moved by a hydraulic pressure supplied into the cylinder chamber 32. The driving pulley 16, the V-belt 24 and the driven pulley 26 constitute a V-belt type continuously variable transmission mechanism 29. The driven shaft 28 is fixed with a driving gear 46 which, in turn, is engaged with an idler gear 48 provided on an idler shaft 52. The idler shaft 52 is further provided with a pinion gear 54 which is engaged with a final gear 44. The final gear 44 rotatably supports a pair of pinion gears 58, 60 which are engaged with a pair of side gears 62, 64. The pinion gears 58, 60 and the side gears 52, 64 constitute a differential gearing device 56, while the side gears 62, 64 are respectively connected to output shafts 66, 68 which, in turn, respectively connected to right and left wheels (not shown) of the vehicle.

In such a driving force transmitting mechanism, a rotational driving force brought from the output shaft 10a of the engine 10 is transmitted to the forward-drive/reverse-drive switching mechanism 15 through the torque converter 12 and the rotational shaft 13. When the forward clutch 40 is engaged and the reverse brake 50 is released, the rotational driving force brought to the rotational shaft 13 is transmitted to the driving shaft 14 with the same rotating direction through the planetary gearing mechanism 17 in which the sun gear 19 is solidly connected to the pinion carrier 25 by the engaged forward clutch 40. On the other hand, when the reverse brake 50 is engaged and the forward clutch 40 is released, the rotational driving force brought to the rotational shaft 13 is transmitted to the driving shaft 14 with the counter rotating direction by an action of the planetary gearing mechanism 17 in which the internal gear 27 is secured to the stationary part of the continuously variable transmission through the engaged reverse brake 50. The rotational driving force brought to the driving shaft 14 is transmitted to the differential gearing device 56 through the driving pulley 16, the V-belt 24, the driven pulley 26, the driven shaft 28, the driving gear 46, the idler gear 48, the idler shaft 52, the pinion gear 54 and the final gear 44. Thus, the output shafts 66, 68 rotate in a forward running direction and a backward running direction selectively, so that the vehicle is driven. Incidentally, when the forward clutch 40 and the reverse brake 50 are both released, the driving force transmitting mechanism is in a neutral condition, in which the driving force brought from the engine 10 is not transmitted to the output shafts 66, 68.

During transmitting the rotational driving force, the continuously variable transmission mechanism 29 can control a pulley ratio which corresponds to a transmission ratio i.e. a speed ratio between a rotation speed of the driving pulley 15 and a rotating speed of the driven pulley 26, by varying radiuses of contacting points between the V-belt 24 and the pulleys 16, 26, by varying width of grooves of the pulleys 16, 26. For example, when the groove width of the driving pulley 16 is extended while the groove width of the driven pulley 25 is narrowed, a radius of contacting points between the V-belt 24 and the driving pulley 16 becomes small while a radius of contacting points between the V-belt 24 and the driven pulley 26 becomes large, as a result of this a large pulley ratio which corresponds to so called "Low" of the transmission ratio with large value can be obtained. On the other hand, when the groove width of the driving pulley 16 is narrowed while the groove width of the driven pulley 25 is extended, a radius of contacting points between the V-belt 24 and the driving pulley 15 becomes large while a radius of contacting points between the V-belt 24 and the driven pulley 26 becomes small, as a result of this a small pulley ratio which corresponds to so called "High" of the transmission ratio with small value can be obtained.

Figure 2:
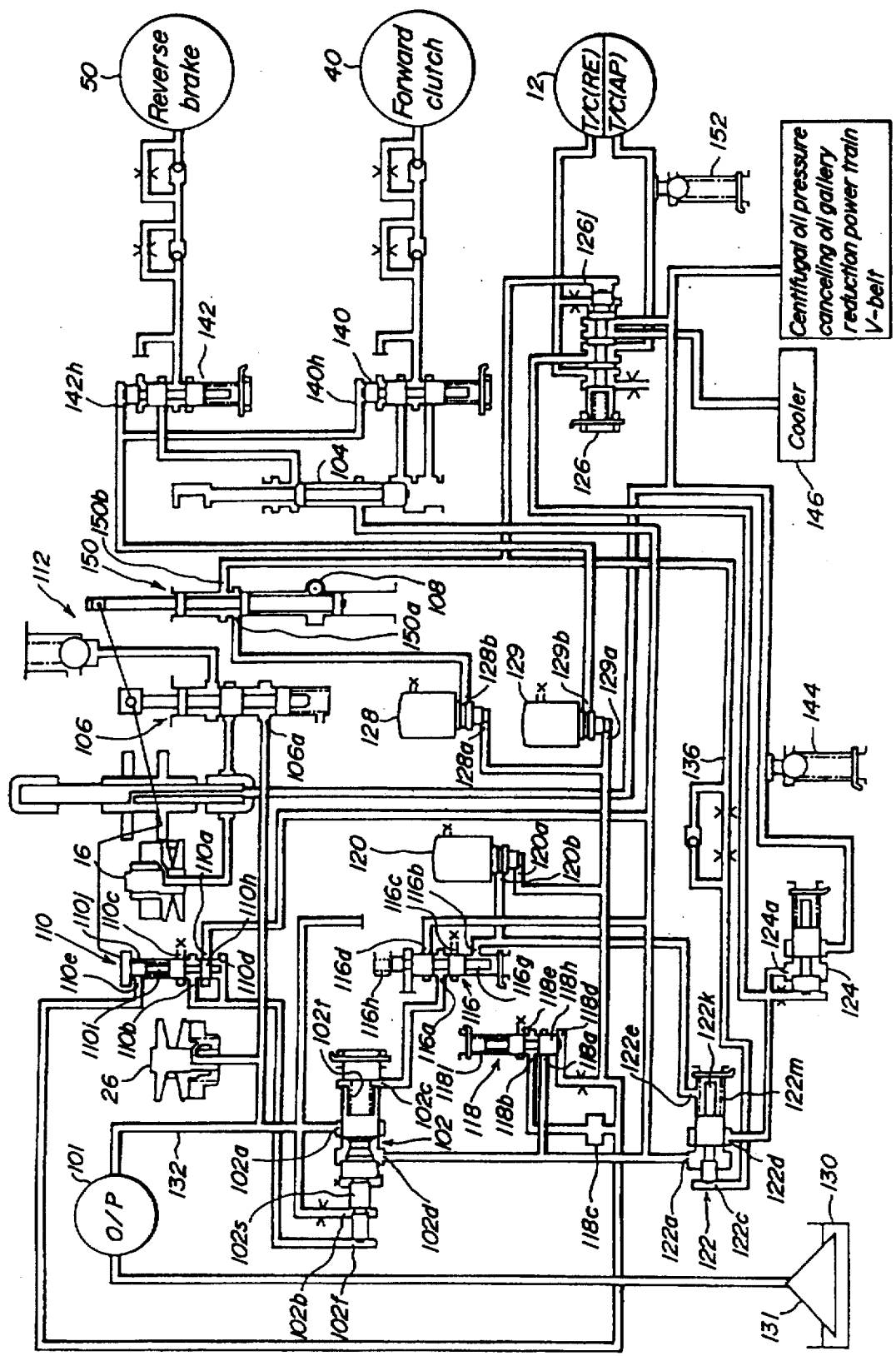
FIG. 2 is a schematic diagram showing one example of a hydraulic control system of the continuously variable transmission shown in FIG. 1, which hydraulic control system includes a first preferred embodiment of a working fluid pressure control device according to the present invention.

Next, the hydraulic control system shown in FIG. 2 is explained. The hydraulic control system includes the first preferred embodiment of a working fluid pressure control device according to the present invention. The hydraulic control system comprises an oil pump 101 as a hydraulic pump driven by the engine 10, a line pressure regulator valve 102, a manual valve 104, a transmission ratio control valve 105, a stepping motor 108, a transmission ratio corresponding pressure developer valve 110, a transmission ratio control mechanism 112, a pressure modifier valve 116, a constant pressure developer valve 118, a line pressure control solenoid valve 120 which is duty controlled in this example, a clutch relief valve 122 as a pressure reducer valve, a torque converter relief valve 124, a lock-up control valve 126, a lock-up control solenoid valve 128 which is ON/OFF controlled in this example, a clutch control solenoid valve 129 which is duty controlled in this example, a transmission ratio director valve 150, and so on. With respect to the above-mentioned hydraulic control system elements, only a part relating to the present invention is explained here in below for easy understanding of the operation. If required more explanation, please refer a specification of Japanese Patent Application No. 6-47564 which is filed by the same applicant i.e. Nissan Motor Co., Ltd. as of the Japanese Applications No. 6-144593, 6-144594 and 6-144595 on which the Pari's priority of the present Application is based, because a similar hydraulic control system is explained in detail in the specification of the Japanese Patent Application No. 6-47564, pages 11 to 19.

The oil pump 101 sucks oil from an oil tank 130 through a strainer 131, and expels the oil into an oil passage 132. The oil expelled in the oil passage 132 is supplied to a port 102a of the line pressure regulator valve 102, then a pressure of the supplied oil is regulated as a line pressure to a given pressure according to given line pressure characteristics, by the line pressure regulator valve 102. The regulated line pressure is supplied into the cylinder chamber 32 of the driven pulley 26 and a port 106a of the transmission ratio control valve 106, respectively.

The pressure modifier valve 115 has a port 116a communicated with the a pilot port 102c of the line pressure regulator valve 102, a pilot port 116b which is supplied with an output pressure of the line pressure controller solenoid valve 120 as a pilot pressure, a drain port 116c communicated with the oil tank 130, an input port 116d communicated with an output port 102d as an expelling port of the line pressure regulator valve 102, a spool 116g with two lands, and a return spring 116h urging the spool 116g toward the pilot port 116b. In the pressure modifier valve 116, when the pilot pressure in the pilot port 116b is almost zero, the port 116a and the drain port 116c are mutually communicated, on the other hand when the pilot pressure in the pilot port 116b is increased, the port 116a and the input port 116d become mutually communicated due to upward movement of the spool 116g opposing to the urging force of the return spring 116h.

The constant pressure developer valve 118 has an input port 118a communicated with the output port 102d of the line pressure regulator valve 102, an output port 118b, a pilot port 118d which is supplied with an output pressure of the own output port 118b as a pilot pressure through a filter 118c, a drain port 118e communicated with the oil tank 130, a spool 118h with two lands, and a return spring 118i urging the spool 118h toward the pilot port 118d. The constant pressure developer valve 118 develops a constant pressure by a well known way of using pressure controlling action by the pilot pressure opposing to the urging force of the return spring 118i, and supplies the constant pressure from the output port 118b to the line pressure control solenoid valve 120, the lock-up control solenoid valve 128 and the clutch control solenoid valve 129.

The line pressure control solenoid valve 120 has an input port 120a communicated with the output port 118b of the constant pressure developer valve 118, and an output port 120b communicated with the pilot port 118b of the pressure modifier valve 116. When the line pressure control solenoid valve 120 is not energized, the line pressure control solenoid valve 120 in OFF condition closes own inner drain port, then supplies highest modifier control pressure from the output port 120b to the pressure modifier valve 115 to increase the line pressure in highest pressure condition at a certain transmission ratio. On the other hand, when the line pressure control solenoid valve 120 is energized by the electronic control system shown in FIG. 3 with a duty ratio based on an aiming transmission ratio and a current throttle opening degree, the line pressure control solenoid valve 120 opens the drain port with a frequency corresponding to the duty ratio, then supplies a modifier control pressure which is reduced corresponding to the duty ratio, from the output port 120b to the pressure modifier valve 116 to vary the line pressure with relation to the aiming transmission ratio and the current throttle opening degree.

The lock-up control solenoid valve 128 as an input port 128a communicated with the output port 118b of the constant pressure developer valve 118, and an output port 128b communicated with an input port 150a of the transmission ratio director valve 150. When the lock-up control solenoid valve 128 is not energized, the lock-up control solenoid valve 128 in OFF condition opens own inner drain port, then makes the lock-up mechanism of the torque converter 12 in the non-locking-up condition. On the other hand, when the lock-up control solenoid valve 128 is energized by the electronic control system shown in FIG. 3, the lock-up control solenoid valve 128 is ON condition closes the drain port, then supplies a lock-up control pressure PLU to the input port 150a of the transmission ratio director valve 150 to change the lock-up mechanism of the torque converter 12 in the locking-up condition.

The clutch control solenoid valve 129 has an input port 129a communicated with the output port 118b of the constant pressure developer valve 118, and an output port 129b communicated with pilot ports 140h, 142h of a forward clutch control valve 140 and a reverse brake control valve 142. When the clutch control solenoid valve 129 is not energized, the clutch control solenoid valve 129 opens own inner drain port, so that the clutch pressure can be fully supplied from the clutch relief valve 122 to the forward clutch control valve 140 and the reverse brake control valve 142. On the other hand, when the clutch control solenoid valve 129 is energized by the electronic control system shown in FIG. 3 with a certain duty ratio for a known creep control or a known anti-skid control, the clutch control solenoid valve 129 closes the drain port with a frequency corresponding to the duty ratio, then supplies a clutch control pressure PCC which is increased corresponding to the duty ratio, from the output port 129b to the forward clutch control valve 140 and the reverse brake control valve 142 to reduce a clutching force of the forward clutch 40 and a braking force of the reverse brake 50.

The line pressure regulator valve 102 has the input port 102a, the pilot port 102c and the output port 102d each formed in a large diameter bored portion, a pilot port 102b formed in a middle diameter bored portion which is communicated with the large diameter bored portion, a pilot port 102f formed in a small diameter bored portion which is communicated with the middle diameter bored portion, a spool 102s with four lands corresponding to the bored portions, and a return spring 102t urging the spool 102s toward the pilot port 102f. The line pressure regulator valve 102 regulators the line pressure by controlling an opening area between the input port 102a and the output port 102d by moving the spool 102s under balancing based on pilot pressures supplied to the pilot ports 102b, 102c, 102f, pressure subjecting areas of the spool 102s, and the urging force of the return spring 102t.

The clutch relief valve 122 has an input port 122a, an output port 122d and a pilot port 122e each formed in a large diameter bored portion, a pilot port 122c formed in a small diameter bored portion which is communicated with the large diameter bored portion, a spool 122k with two lands corresponding to the bored portions, and a return spring 122m urging the spool 122k toward the pilot port 122c. The input port 122a is directly communicated with the output port 102d of the line pressure regulator valve 102, while the pilot port 122c is communicated with a pilot port 126j of the lock-up control valve 126 and an output port 150b of the transmission ratio director valve 150, further the output port 122d is communicated with an input port 124a of the torque converter relief valve 124, in which a spool of the transmission ratio director valve 150 and a spool of the transmission ratio control valve 106 are connected to the axially movable conical disk 22 of the driving pulley 16 through a lever of the transmission ratio control mechanism 112 similarly to that of the hydraulic control system in the specification of the above-mentioned Japanese Patent Application No. 5-47564.

The transmission ratio corresponding pressure developer valve 110 has an input port 110a, an output port 110b, a drain port 110c, two pilot ports 110d, 110e, a spool 110h with three lands, a slidable spring stopper 110i, and a return spring 110j interposed between the spool 110h and the slidable spring stopper 110i and urging the spool 110h toward the pilot port 110d. The input port 110a is communicated with the input port 118a of the constant pressure developer valve 118, while the output port 110b is communicated with the pilot port 102f of the line pressure regulator valve 102 and the own pilot port 110d, further the other pilot port 110e is communicated with the pilot port 118d of the constant pressure developer valve 118. Further, the slidable spring stopper 110i is connected to the axially movable conical disk 22 of the driving pulley 16 through a connecting element which moves the slidable spring stopper 110i with the axially movable conical disk 22 in the same direction.

With the transmission ratio corresponding pressure developer valve 110, when the pulley width of the driving pulley 16 is wide, the slidable spring stopper 110i occupies a high position in FIG. 2, therefore the urging force of the return spring 110j becomes to small that a pilot pressure for the pilot port 102f brought from the output port 110b becomes high, resulting a reduced line pressure in the passage 132, which is regulated by the line pressure regulator valve 102. On the other hand, when the pulley width of the driving pulley 16 is narrowed, the slidable spring stopper 110i is slid down toward a low position in FIG. 2, therefore the urging force of the return spring 110j increases, so that a pilot pressure for the pilot port 102f brought from the output port 110b becomes lower, resulting an increased line pressure in the passage 132, which is regulated by the line pressure regulator valve 102.

Figure 3:
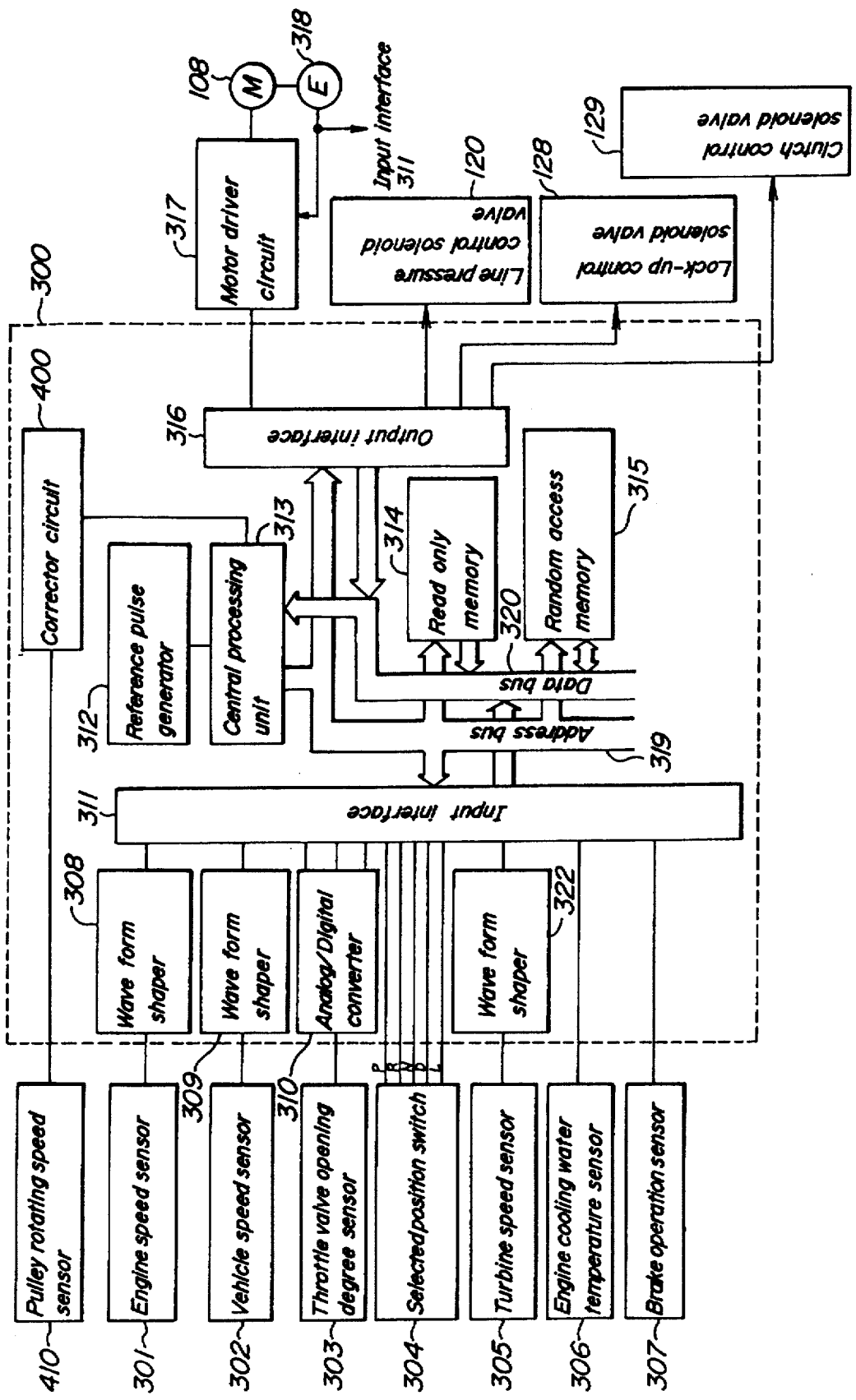
FIG. 3 is a schematic diagram showing an electronic control system of the continuously variable transmission shown in FIG. 1, which electronic control system is associated with the hydraulic control systems shown in FIG. 2 for the first preferred embodiment of a working fluid pressure control device according to the present invention, and which electronic control system is associated with a hydraulic control systems shown in FIG. 6 for a second preferred embodiment of a working fluid pressure control device according to the present invention.

Next, the electronic control system shown in FIG. 3 is explained. The electronic control system is associated with the hydraulic control systems shown in FIG. 2 for the first preferred embodiment of a working fluid pressure control device according to the present invention. The electronic control system 300 comprises an input interface 311 connected with wave form shapers 308, 309, 322 and an analog/digital converter 310, a central processing unit (CPU) 313 connected with a reference pulse generator 312 and a corrector circuit 400, a read only memory 314, a random access memory 315, an output interface 316, and an address bus 319 which interconnects the CPU 313, the interfaces 311, 316, and the memories 314, 315, and further comprises a data bus 320 which also interconnects the CPU 313, the interfaces 311, 316, and the memories 314, 315. In the electronic control system 300, the input interface 311 is connected with an engine speed sensor 301, a vehicle speed sensor 302, a turbine speed sensor 305 and a throttle valve opening degree sensor 303 through the wave form shapers 308, 309, 322 and the analog/digital converter 310. The input interface 311 is directly connected with a selected position switch 304, an engine cooling water temperature sensor 306 and a brake operation sensor 307. The corrector circuit 400 is connected with a pulley rotating speed sensor 410. Further, in the electronic control system 300, the output interface 316 is connected with a motor driver circuit 317, the line pressure control solenoid valve 120, the lock-up control solenoid valve 128 and the clutch control solenoid valve 129. With respect to operations of the electronic control system 300, only a part relating to the present invention is explained here in below for easy understanding. If required more explanation, please refer the specification of the above-mentioned Japanese Patent Application No. 6-47564, pages 19 to 21.

The electronic control system 300 serves to control the stepping motor 108, the line pressure control solenoid valve 120, the lock-up control solenoid valve 128 and the clutch control solenoid valve 129, and performs typical controls of the continuously variable transmission by executing control programs not shown. Further, the electronic control system 300 makes the above-mentioned hydraulic control system to perform a change of line pressure characteristics by executing a control program shown in FIG. 4.

FIG. 4 shows a flow chart of a control program for changing the source pressure for the pressure modifier valve 116. The control program is executed on every certain time interval by interruptions of predetermined timing. At a step 501, a determination is made as to whether the lock-up mechanism executes the lock-up or not. In this embodiment, the determination is made based on a lock-up signal which is e.g. generated when current vehicle speed exceeds a predetermined speed (e.g. 10 km/h) for changeover between the non-locking-up condition and the locking-up condition.

13

However, another signal may be utilized, which signal indicates a quick variation of the input torque from the torque converter 12 caused by changeover between the non-locking-up condition and the locking-up condition. When the result of the determination is "Yes", then the control proceeds to a step 502, on the other hand, when the result of the determination is "No", then the control proceeds to a step 503.

Figure 5A:
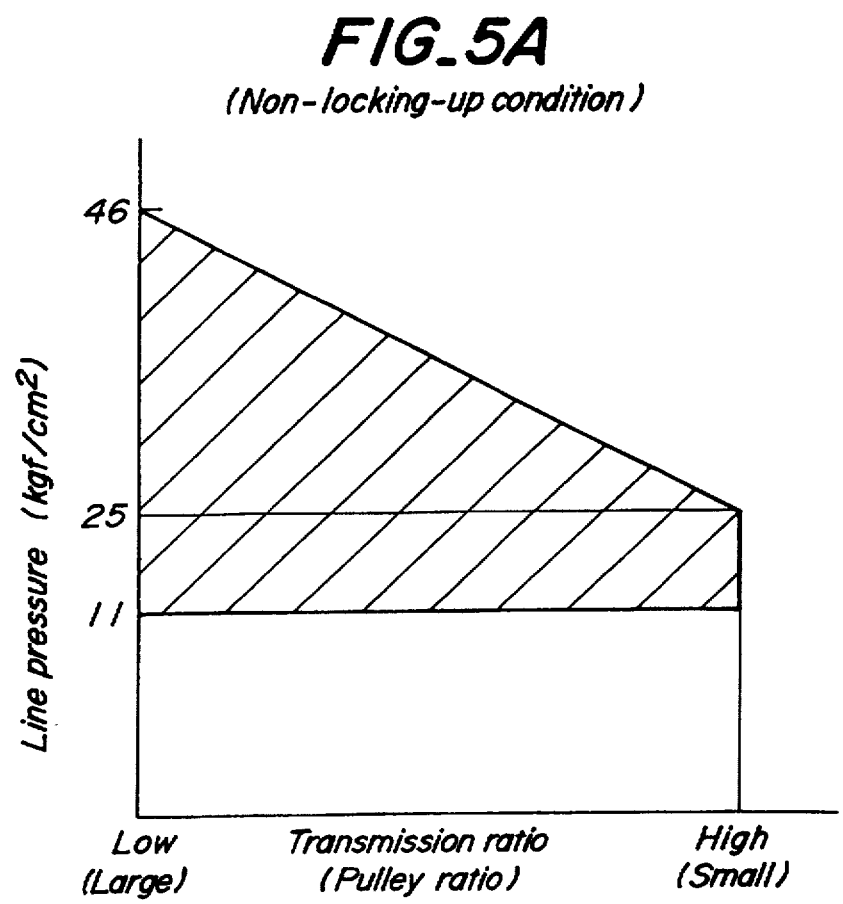
FIG. 5A is a diagram explaining operation of the first embodiment of a working fluid pressure control device according to the present invention.
Figure 5B:
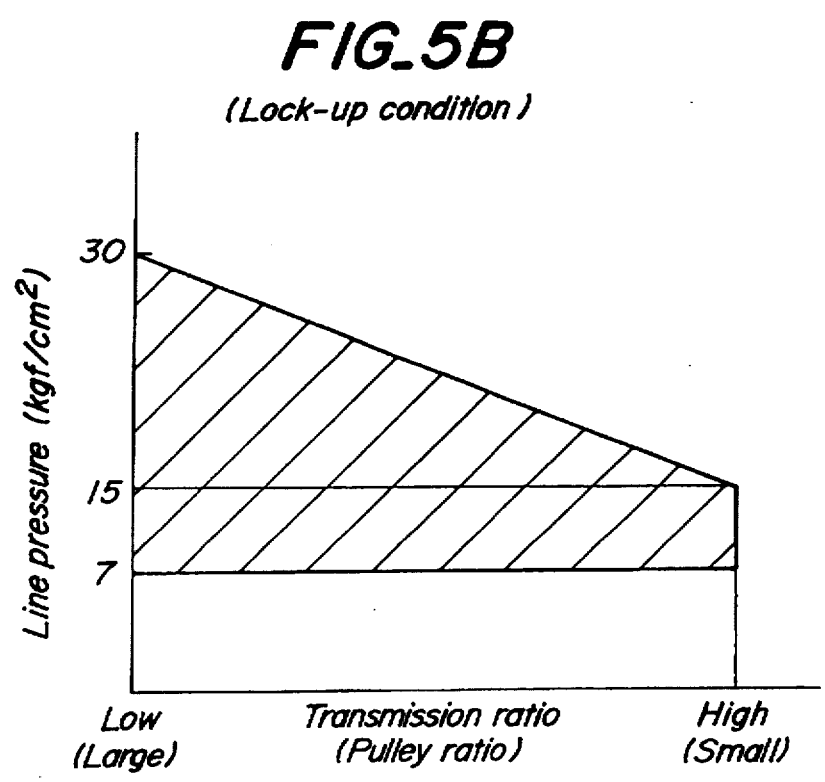
FIG. 5B is a diagram explaining another operation of the first embodiment of a working fluid pressure control device according to the present invention.

At the step 502, "ON" command is supplied to the lock-up control valve 128, i.e. the lock-up control valve 128 is made to "ON" condition by energizing, so that the source pressure for the pressure modifier valve 116 is reduced to a certain low pressure (e.g. 6 kgf/cm$^2$ which is the same as of the known working fluid pressure control device) by the changeover of the source pressure, resulting a lower line pressure characteristics relating to a transmission ratio and an engine load as shown in FIG. 5B. With this lower line pressure characteristics, the line pressure is regulated in a region which is enclosed by four lines connecting four points having coordinates of (Low, 7), (Low, 30), (High, 7) and (High, 15). According to the lower line pressure characteristics for the locking-up condition, the line pressure regulator valve 102 regulates the line pressure in a narrow bounds between 7 kgf/cm$^2$ and 30 kgf/cm$^2$ with the pilot pressure in the bounds between 0 kgf/cm$^2$ and 6 kgf/cm$^2$ to prevent slipping of the V-belt and to obtain an advanced fuel consumption ratio, so that a control gain G of the line pressure regulator valve becomes low as 3.83 (.e. G=(30−7)/6−0)=3.83).

On the other hand, at the step 503, "OFF" command is supplied to the lock-up control valve 128, i.e. the lock-up control valve 128 is made to "OFF" condition by non-energizing, so that the source pressure for the pressure modifier valve 116 is increased to a certain high pressure (e.g. 10 kgf/cm$^2$ which is higher than that of the known working fluid pressure control device) by the changeover of the source pressure, resulting a higher line pressure characteristics relating to a transmission ratio and an engine load as shown in FIG. 5A. With this higher line pressure characteristics, the line pressure is regulated in a region which is enclosed by four lines connecting four points having coordinates of (Low, 11), (Low, 46), (High, 11) and (High, 25). According to the lower line pressure characteristics for the locking-up condition, the line pressure regulator valve 102 regulates the line pressure in a narrow bounds between 11 kgf/cm$^2$ and 46 kgf/cm$^2$ with the pilot pressure in the wider bounds between 0 kgf/cm$^2$ and 10 kgf/cm$^2$ to prevent slipping of the V-belt and to obtain an advanced fuel consumption ratio, so that a control gain G of the line pressure regulator valve becomes low as 3.5 (i.e. G=(45−11)/(10−0)=3.5).

Therefore, in this embodiment, the lock-up control solenoid valve 128 corresponds to the line pressure characteristics changing means of the present invention.

Thus, with the first preferred embodiment of the present invention, a higher line pressure and a higher clutch pressure can be developed under non-locking-up condition of the lock-up mechanism, so that it can be assured to prevent slipping of the V-belt 24, the forward clutch 40 and the reverse brake 50, while a lower line pressure and a lower clutch pressure can be developed under locking-up condition of the lock-up mechanism, so that an advanced fuel consumption ratio of the engine 10 can be achieved. That is, the first preferred embodiment is capable of achieving both of an advanced fuel consumption ratio and required higher clutch pressure.

Further, with the first preferred embodiment of the present invention, as explained above, lower control gain G of the line pressure regulator valve 102 can be obtained, so that advanced line pressure control precision can be achieved.

Furthermore, with the first preferred embodiment of the present invention, the working fluid pressure control device has a common solenoid valve 128 for the line pressure characteristics changing means and for lock-up control means for controlling the lock-up mechanism, so that a constitution of the working fluid pressure control device can be simplified.

FIG. 6 shows another example of a hydraulic control system of the continuously variable transmission shown in FIG. 1, which hydraulic control system includes the second preferred embodiment of a working fluid pressure control device according to the present invention. The hydraulic control system shown in FIG. 6 is constituted similarly to the hydraulic control system shown in FIG. 2, and is associated with the electronic control system shown in FIG. 3, so that only different parts are explained here in below.

That is, in the hydraulic control system shown in FIG. 6 for the second preferred embodiment of a working fluid pressure control device according to the present invention, the input port 115d of the pressure modifier valve 116 is communicated not with the output port 102d of the line pressure regulator valve 102, but with the input port 102a and the pilot port 102b of the line pressure regulator valve 102, on the other hand, the line pressure regulator valve 102 is provided with another pilot port 102e in the large diameter bored portion, which is communicated with the output port 128b of the lock-up control solenoid valve 128 through the transmission ratio director valve 150 and an oil passage 137. Further, in the hydraulic control system shown in FIG. 6, all of the line pressure control solenoid valve 120, the lock-up control control solenoid valve 128 and the clutch control solenoid valve 129 are ON/OFF controlled, so as to simplify the control. The line pressure control solenoid valve 120 opens the own inner drain port and reduces a modifier control pressure in the output port 120a to almost zero, in ON condition which is selected when the locking-up is executed. The lock-up control solenoid valve 128 closes the own inner drain port to supply the lock-up control pressure PLU, in ON condition which is selected when the locking-up is executed. The clutch control solenoid valve 129 opens the own inner drain port to supply a predetermined clutch control pressure PCC, in OFF condition which is selected when a known creep control or a known anti-skid control is executed.

Figure 7:
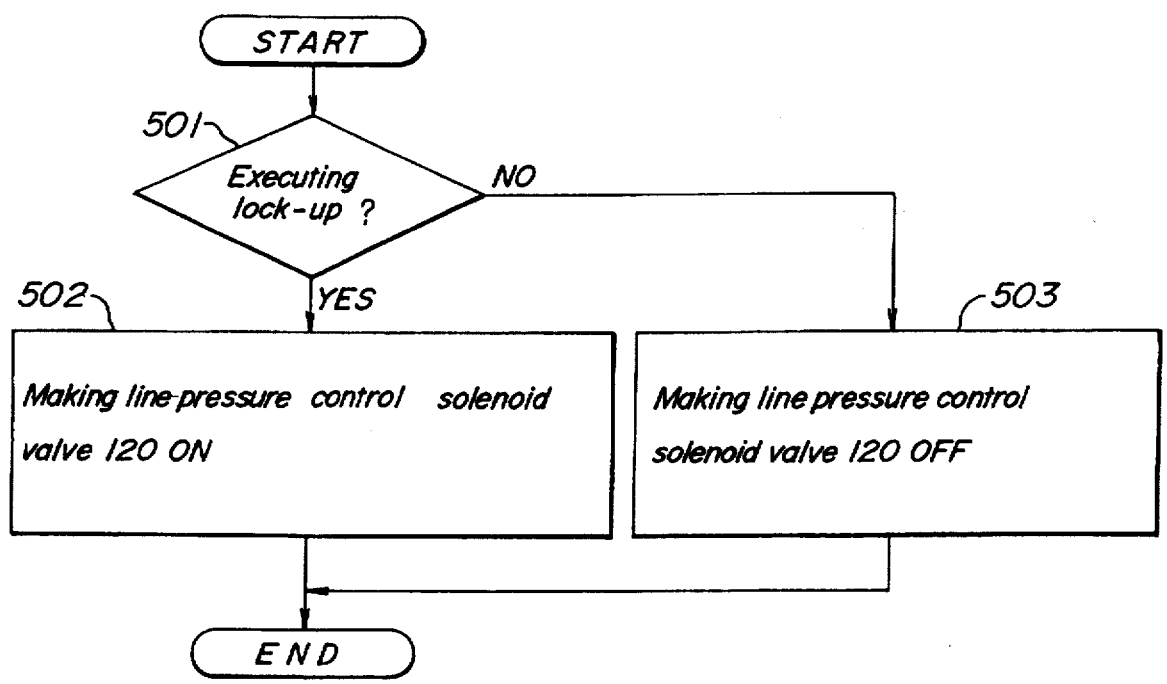
FIG. 7 is a flow chart showing a control program which is executed by the electronic control system shown in FIG.

Further, the electronic control system 300 makes the above-mentioned hydraulic control system to perform changing of a line pressure characteristics by executing a control program shown in FIG. 7.

FIG. 7 shows a flow chart of a control program for changing the pilot pressure for the pressure modifier valve 116. The control program is executed on every certain time interval by interruptions of predetermined timing. At a step 501, a determination is made as to whether the lock-up mechanism executes the lock-up or not. In this embodiment, the determination is made based on a lock-up signal which is e.g. generated with current vehicle speed exceeds a predetermined speed (e.g. 10 km/h) for changeover between the non-locking-up condition and the locking-up condition. However, another signal may be utilized, each signal indicates a quick variation of the input torque from the torque converter 12 caused by changeover between the non-locking-up condition and the locking-up condition. Further, at the step 501, another determination may be made as to whether the input torque from the torque converter 12 exceeds a predetermined torque or not, by which the change of a line pressure characteristics can be made when the V-belt, the forward clutch and the reverse brake are subjected to a large torque not only under the non-locking-up condition but also another condition.

When the result of the determination is "Yes", then the control proceeds to a step 502, on the other hand, when the result of the determination is "No", then the control proceeds to a step 503.

At the step 502, "ON" command is supplied to the line pressure control solenoid valve 120, i.e. the line pressure control solenoid valve 120 is made to "ON" condition by energizing, so that the output pressure of the pressure modifier valve 116 and the clutch pressure developed by the clutch control valve 122 are reduced, resulting a lower line pressure characteristics relating to a transmission ratio as shown in FIG. 8. With the lower line pressure characteristics, the line pressure is regulated in narrow bounds, causing low control gain G of the line pressure regulator valve 102.

On the other hand, at the step 503, "OFF" command is supplied to the line pressure control valve 120, i.e. the line pressure control solenoid valve 120 is made to "OFF" condition by non-energizing, so that the output pressure of the pressure modifier valve 116 and the clutch pressure developed by the clutch control valve 122 are increased, resulting a higher line pressure characteristics relating to a transmission ratio as shown in FIG. 8. With the higher line pressure characteristics, the line pressure is regulated in narrower bounds, causing also low control gain G of the line pressure regulator valve 102.

Therefore, in this embodiment, the line pressure control solenoid valve 120 corresponds to the line pressure characteristics changing means of the present invention.

Thus, with the second preferred embodiment of the present invention, a higher line pressure and a higher clutch pressure can be developed under non-locking-up condition of the lock-up mechanism, so that it can be assured to prevent slipping of the V-belt 24, the forward clutch 40 and the reverse brake 50, while a lower line pressure and a lower clutch pressure can be developed under locking-up condition of the lock-up mechanism, so that an advanced fuel consumption ratio of the engine 10 can be achieved. That is, the second preferred embodiment is capable of achieving both of an advanced fuel consumption ratio and required higher clutch pressure.

Further, with the second preferred embodiment of the present invention, as explained above, lower control gain G of the line pressure regulator valve 102 can be obtained, so that advanced line pressure control precision can be achieved.

In this connection, when assuming the pressure modifier valve is supplied with the reduced pressure as a source pressure and is controlled by a solenoid, the characteristics of the line pressure regulated by the line pressure regulator valve may be change between a higher line pressure characteristics and a lower line pressure characteristics which is parallel to the higher line pressure characteristics, as shown in FIG. 9 by a reference example, resulting excess line pressure especially in a lower range of the transmission ratio under the locking-up condition. Further, with the lower line pressure characteristics in FIG. 9, when assuming the clutch relief valve 122 is not simultaneously controlled with the pressure modifier valve, and required a higher clutch pressure (e.g. 10 kgf/cm²), the higher clutch pressure restrains reduction of the line pressure, resulting excess line pressure especially in a higher range of the transmission ratio under the locking-up condition.

Contrary to the assume cases, with the second preferred embodiment, as shown in FIG. 8, the incline of the lower characteristics of the line pressure can be varied from the incline of the higher characteristics of the line pressure, owing to the feedback of the line pressure to the line pressure regulator valve 102 through the pressure modifier valve 116. By the difference of the inclines, the highest line pressure in the lower characteristics of the line pressure in a lower range of the transmission ratio under the locking-up condition of the lock-up mechanism is reduced, causing further advanced fuel consumption ratio of the engine 10, without causing slipping of the V-belt 24 under the non-locking up condition.

Further, with the second preferred embodiment, the line pressure control solenoid valve 120 makes the clutch relief valve 122 to change the clutch pressure for the forward clutch 40 and the reverse brake 50 between a higher pressure and a lower pressure, simultaneously with changing of the line pressure characteristics. Therefore, a lower line pressure under the locking up condition for achieving an advanced fuel consumption ratio of the engine 10 can be achieved especially in a higher range of the transmission ratio without restraint of the line pressure, while a higher clutch pressure enough to prevent slipping of the forward clutch 40 and the reverse brake 50 under the non-locking up condition can be obtained.

Incidentally, in the embodiment, the lock-up control solenoid valve 128 is provided independent to the line pressure control solenoid valve 120. However, the line pressure control solenoid valve 120 may be a common solenoid valve for the lock-up control solenoid valve 128. With the common solenoid valve, constitution and control of the working fluid pressure control device can be simplified.

The foregoing description is by way of example only, and not intended to limit the scope of the appended claims.

I claim:

1. A working fluid pressure control device for a hydraulic control system of a continuously variable transmission, which includes a torque converter with a lock-up mechanism and associated with an engine, a driving pulley with a cylinder chamber for varying a groove width thereof, a driven pulley with a cylinder chamber for varying a groove width thereof, a V-belt for transmitting driving force between the driving and driven pulleys, and at least one clutch mechanism, the working fluid pressure control device comprising:

a line pressure regulator valve for regulating line pressure for the cylinder chambers of the driving and driven pulleys from a source pressure supplied from a hydraulic pump driven by the engine, and varying the line pressure in accordance with a line pressure characteristic relating to a transmission ratio between the driving and driven pulleys;

a pressure reducer valve for reducing output pressure from the line pressure regulator valve to the at least one clutch mechanism; and line-pressure characteristic changing means for changing the line pressure characteristic, lowering the line pressure characteristic when the lock-up mechanism is locking-up and increasing the line pressure characteristic when the lock-up mechanism is not locking-up, wherein an incline of the line pressure characteristic relating to the transmission ratio and the line pressure relating to the transmission ratio are different between lower and higher characteristics.

2. A working fluid pressure control device according to claim 1, wherein the line-pressure characteristic changing means includes two ports having different areas for receiving pressure on the line pressure regulator valve, one of the ports always being supplied with the line pressure, and the other port being supplied with a control pressure varying in accordance with whether the lock-up mechanism is locking-up.

3. A working fluid pressure control device according to claim 2, wherein the control pressure is developed from the line pressure.

4. A working fluid pressure control device according to claim 1, further comprising a pressure modifier valve, which develops a pilot pressure for the line pressure regulator valve, wherein the line-pressure characteristic changing means includes a source pressure changing means for changing the source pressure supplied to the pressure modifier valve between a low pressure and a high pressure in accordance with whether the lock-up mechanism is locking-up.

5. A working fluid pressure control device according to claim 4, wherein the source pressure changing means includes a switching valve that activates locking-up of the lock-up mechanism.

6. A working fluid pressure control device for a hydraulic control system of a continuously variable transmission, which includes a torque converter with a lock-up mechanism and associated with an engine, a driving pulley with a cylinder chamber for varying a groove width thereof, a driven pulley with a cylinder chamber for varying a groove width thereof, a V-belt for transmitting driving force between the driving and driven pulleys, and at least one clutch mechanism, the working fluid pressure control device comprising:

a line pressure regulator valve for regulating line pressure for the cylinder chambers of the driving and driven pulleys from a source pressure supplied from a hydraulic pump driven by the engine, and for varying the line pressure relating to a transmission ratio between the driving and driven pulleys;

a pressure reducer valve for reducing output pressure from the line pressure regulator valve to the at least one clutch mechanism; and line-pressure varying means for controlling the line pressure regulator valve so that each of (i) an incline of the line pressure characteristic relating to the transmission ratio and (ii) the line pressure relating to the transmission ratio is lower when the lock-up mechanism is locking-up than when the lock-up mechanism is not locking-up.

7. A working fluid pressure control device for a hydraulic control system of a continuously variable transmission, which includes a torque converter with a lock-up mechanism and associated with an engine, a driving pulley with a cylinder chamber for varying a groove width thereof, a driven pulley with a cylinder chamber for varying a groove width thereof, a V-belt for transmitting driving force between the driving and driven pulleys, and at least one clutch mechanism, the working fluid pressure control device comprising:

a line pressure regulator valve for regulating line pressure for the cylinder chambers of the driving and driven pulleys from a source pressure supplied from a hydraulic pump driven by the engine, and for varying the line pressure relating to a transmission ratio between the driving and driven pulleys; and a pressure reducer valve for reducing output pressure from the line pressure regulator valve to the at least one clutch mechanism, wherein the line pressure is varied so that each of (i) an incline of the line pressure characteristic relating to the transmission ratio and (ii) the line pressure relating to the transmission ratio is lower when the lock-up mechanism is locking-up than when the lock-up mechanism is not locking-up.

8. A working fluid pressure control device for a hydraulic control system of a continuously variable transmission, which includes a torque converter with a lock-up mechanism and associated with an engine, a driving pulley with a cylinder chamber for carrying a groove width thereof, a driven pulley with a cylinder chamber for varying a groove width thereof, a V-belt for transmitting driving force between the driving and driven pulleys, and at least one clutch mechanism, the working fluid pressure control device comprising:

a line pressure regulator valve for regulating line pressure for the cylinder chambers of the driving and driven pulleys from a source pressure supplied from a hydraulic pump driven by the engine, and varying the line pressure in accordance with a line pressure characteristic relating to a transmission ratio between the driving and driven pulleys;

a pressure reducer valve for reducing output pressure from the line pressure regulator valve for the at least one clutch mechanism; and a reduced-output pressure changing valve means for changing the reduced output pressure of the pressure reducer valve in accordance with whether the lock-up mechanism is executing locking-up.

9. A working fluid pressure control device according to claim 8, wherein the source pressure supplied to the pressure reducer valve is a pressure of working fluid drained from the line pressure regulator valve for developing the regulated line pressure.

10. A working fluid pressure control device according to claim 8, wherein the reduced-output pressure changing valve means includes a switching solenoid valve that controls both the line pressure regulator valve and the pressure reducer valve.

11. A working fluid pressure control device according to claim 8, wherein the line pressure regulator valve varies the line pressure in accordance with signals relating to an output torque of the engine and the transmission ratio of the driving and driven pulleys.

* * * * *